(12) United States Patent
Aoki et al.

(10) Patent No.: US 6,326,757 B1
(45) Date of Patent: Dec. 4, 2001

(54) ROTATIONAL PULSE GENERATING CIRCUIT FOR COMMUTATOR DC MOTORS

(75) Inventors: Kohji Aoki; Hideyuki Kanie; Hitoshi Ishikawa, all of Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/528,153

(22) Filed: Mar. 17, 2000

(30) Foreign Application Priority Data

Mar. 18, 1999 (JP) .................................................. 11-073694
Jan. 26, 2000 (JP) .................................................. 12-017438

(51) Int. Cl.[7] .............................. H03L 7/00; H12P 5/16; H02P 5/28
(52) U.S. Cl. .......................... 318/599; 318/244; 318/245; 318/603; 318/608
(58) Field of Search .................................... 318/308, 245, 318/629, 244, 470; 388/813, 817, 911; 375/376; 317/156, 160; 369/124.13, 50, 124.1, 59

(56) References Cited

U.S. PATENT DOCUMENTS

| | | | |
|---|---|---|---|
| Re. 29,431 | * | 10/1977 | Desai . |
| 3,898,690 | * | 8/1975 | Desai . |
| 4,494,509 | * | 1/1985 | Long . |
| 4,924,166 | * | 5/1990 | Roussel . |
| 5,497,326 | | 3/1996 | Berland et al. . |
| 5,550,880 | * | 8/1996 | Abdel-Malek et al. . |
| 5,710,714 | * | 1/1998 | Mercadal et al. . |
| 5,994,932 | * | 11/1999 | Ando . |
| 6,081,490 | * | 6/2000 | Kuroda et al. . |
| 6,111,846 | * | 8/2000 | Hayashi . |
| 6,157,603 | * | 12/2000 | Okubo et al. . |
| 6,172,473 | * | 1/2001 | Oka et al. . |
| 6,172,952 | * | 1/2001 | Inokuchi et al. . |
| 6,192,018 | * | 2/2001 | Kobayashi et al. . |
| 6,198,085 | * | 3/2001 | Tateshi . |
| 6,198,354 | * | 3/2001 | Reinhardt et al. . |
| 6,208,216 | * | 3/2001 | Nasila . |

OTHER PUBLICATIONS

Birk, M.: "Unkonventionelle Drehzahlmessung Und –Regelung Bei Gleichstrommotoren Switched–Capacitor–Filter Bestimmt Drehzahl Ausder Welligkeit" Elekronik, DE, franzis Verlag GMBH. Munchen, vol. 33, NR. 25, pp. 71–72, XP002029304 ISSN: 0013–5658.

* cited by examiner

Primary Examiner—Paul Ip
(74) Attorney, Agent, or Firm—Sughrue, Mion, Zinn, Macpeak & Seas, PLLC

(57) ABSTRACT

A rotational pulse signal generating circuit for a commutator DC motor is made up of a filter device for eliminating noise from the motor, a cutoff frequency of the filter device being variable depending on an external signal; a pulse shaping device for generating a ripple pulse indicative of a rotational number of the motor by wave-shaping an output of the filter device; and a clock generating device for generating a clock signal on the basis of the ripple pulse and a rotational condition signal of the motor, the clock signal being fed to the filter device for making the cutoff signal thereof variable.

4 Claims, 9 Drawing Sheets

Fig. 2
(a)
  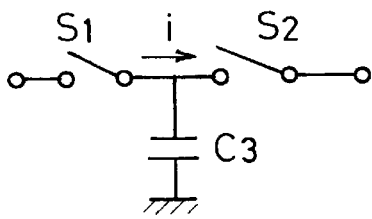
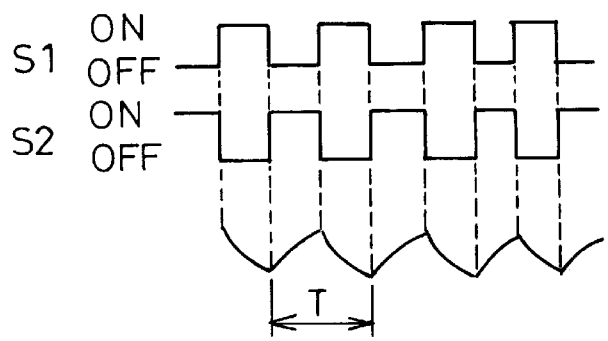
(b)
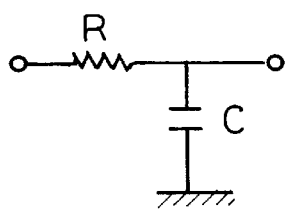  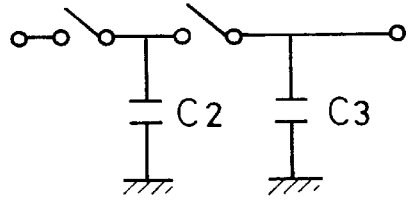
$fc = \dfrac{1}{2\pi RC_1}$  cut off frequency  $fc = \dfrac{1}{2\pi \cdot \dfrac{1}{fC_2} \cdot C_3} = \dfrac{fC_2}{2\pi C_3}$

Fig. 6
(a)
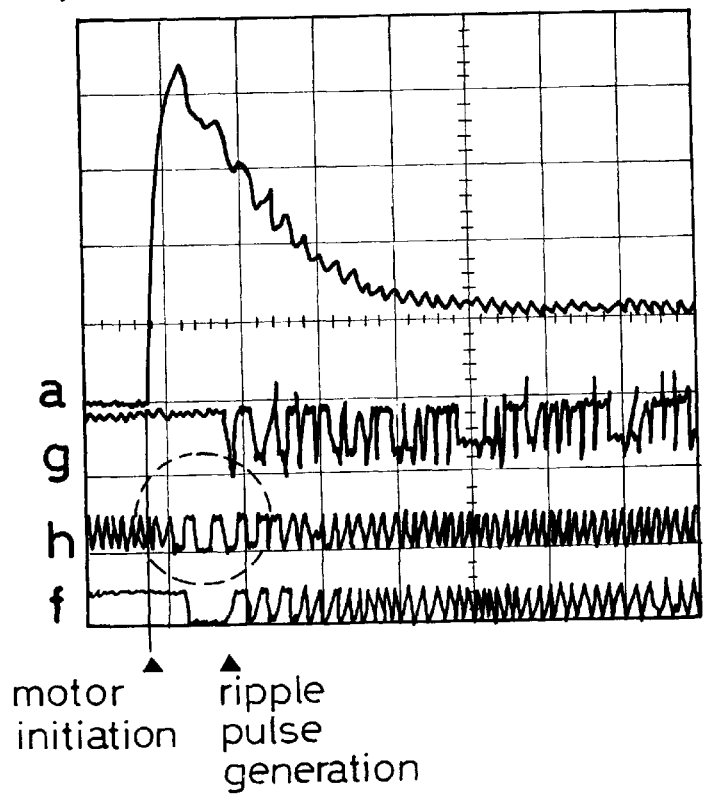
motor initiation   ripple pulse generation
(b)
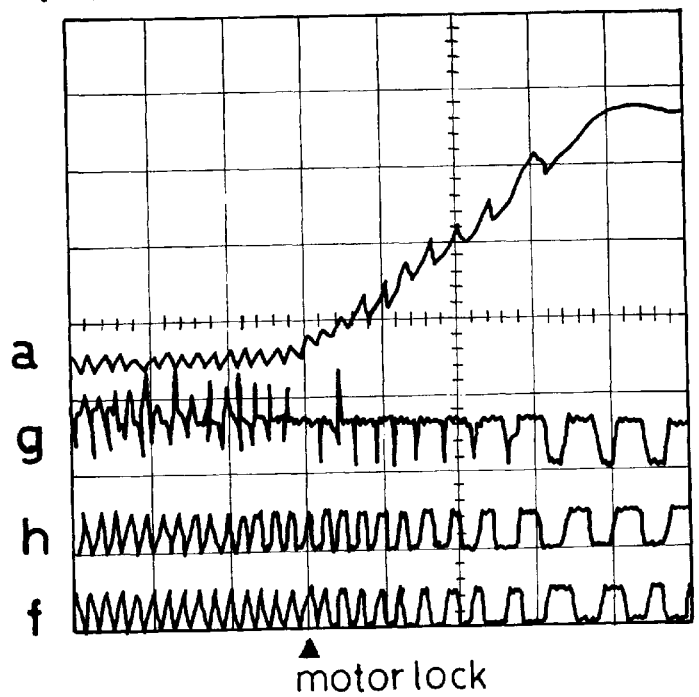
motor lock Fig. 11
(a)
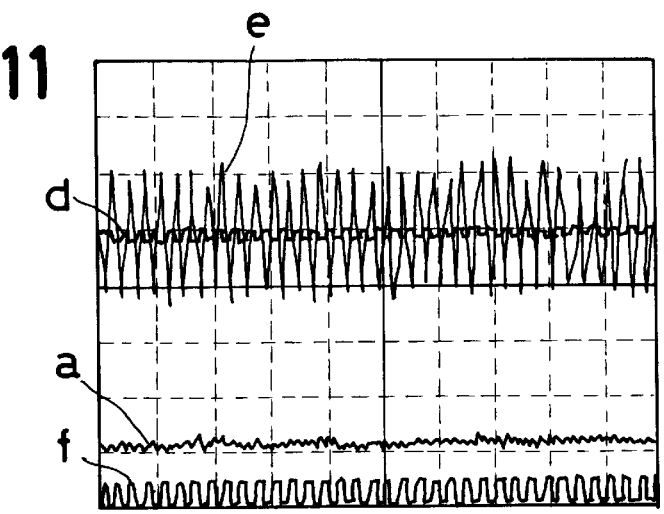
(b)
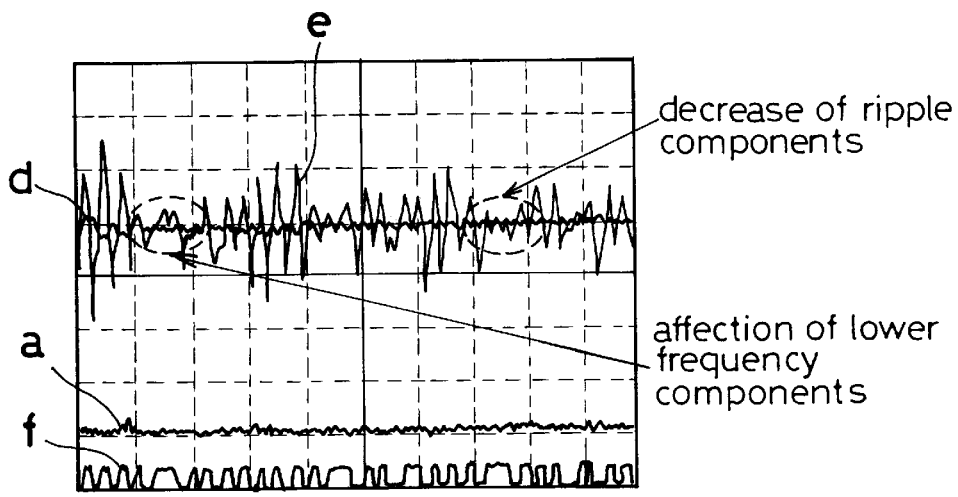
decrease of ripple components
affection of lower frequency components
(c)

ROTATIONAL PULSE GENERATING
CIRCUIT FOR COMMUTATOR DC MOTORS

BACKGROUND OF THE INVENTION

The present invention is directed to a rotational pulse generating circuit for a brush-equipped or commutator DC motor which generates a pulse train signal in synchronization with motor rotation.

The co-pending U.S. Patent Application under the Ser. No. 09/429,922 discloses an electric circuit for detecting a rotational condition of a commutator or brush-equipped DC motor depending on a ripple pulse frequency which is indicative of a rotational number of the commutator DC motor. An output of such a circuit is in the form of a pulse train which is indicative of the rotational number of the commutator DC motor. This circuit is used to control a position of a vehicular movable member such as a seat or window pane which is driven by the commutator DC motor in such a manner that the output pulse train signal is fed to a micro-processor for positioning the vehicular movable member.

On the other hand, using the foregoing positioning device for a long time inevitably causes frictional wear inevitably between a brush and a commutator in the commutator DC motor, which causes the circuit to issue error pulses, thereby raising the question of how to cope with such an issuance of error pulses. The reason is that feeding the error pulses to the micro-processor makes the positioning of the vehicular movable member incorrect to a slight extent which cannot be neglected from the practical view point. Of course, such a problem can be eliminated by periodic inspections. However, doing periodic inspections are very cumbersome.

Thus, a need exits to make the foregoing electric circuit more reliable without periodic inspections.

SUMMARY OF THE INVENTION

It is, therefore, a principal object of the present invention to provide a rotational pulse signal generating circuit for a commutator DC motor which satisfy the need noted above.

In order to attain the foregoing object, the present invention provides a commutator DC motor which is made up of:

filter means for eliminating noise from the motor, the cutoff frequency of the filter means being variable depending on an external signal;

pulse shaping means for generating a ripple pulse indicative of a rotational number of the motor by wave-shaping an output of the filter means; and clock generating means for generating a clock signal on the basis of the ripple pulse and a rotational condition signal of the motor, the clock signal being fed to the filter means for making the cutoff signal thereof variable.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIGS. 2a and 2b shows how to operate a switched capacitance filter of the rotational pulse signal generating circuit shown in FIG. 1.;

FIGS. 6a and 6b shows graphs, each of which is indicative of a waveform at various points in the rotational pulse signal generating circuit shown in FIG. 1;

FIGS. 11a, b, and c are graphs which are indicative of waveform changes in the rotational pulse generating circuit according to the second embodiment of the present invention.

DETAILED DESCRIPTION OF THE PRESENT INVENTION

A preferred embodiment of the present invention will be described hereinafter in detail with reference to the accompanying drawings.

Figure 1:
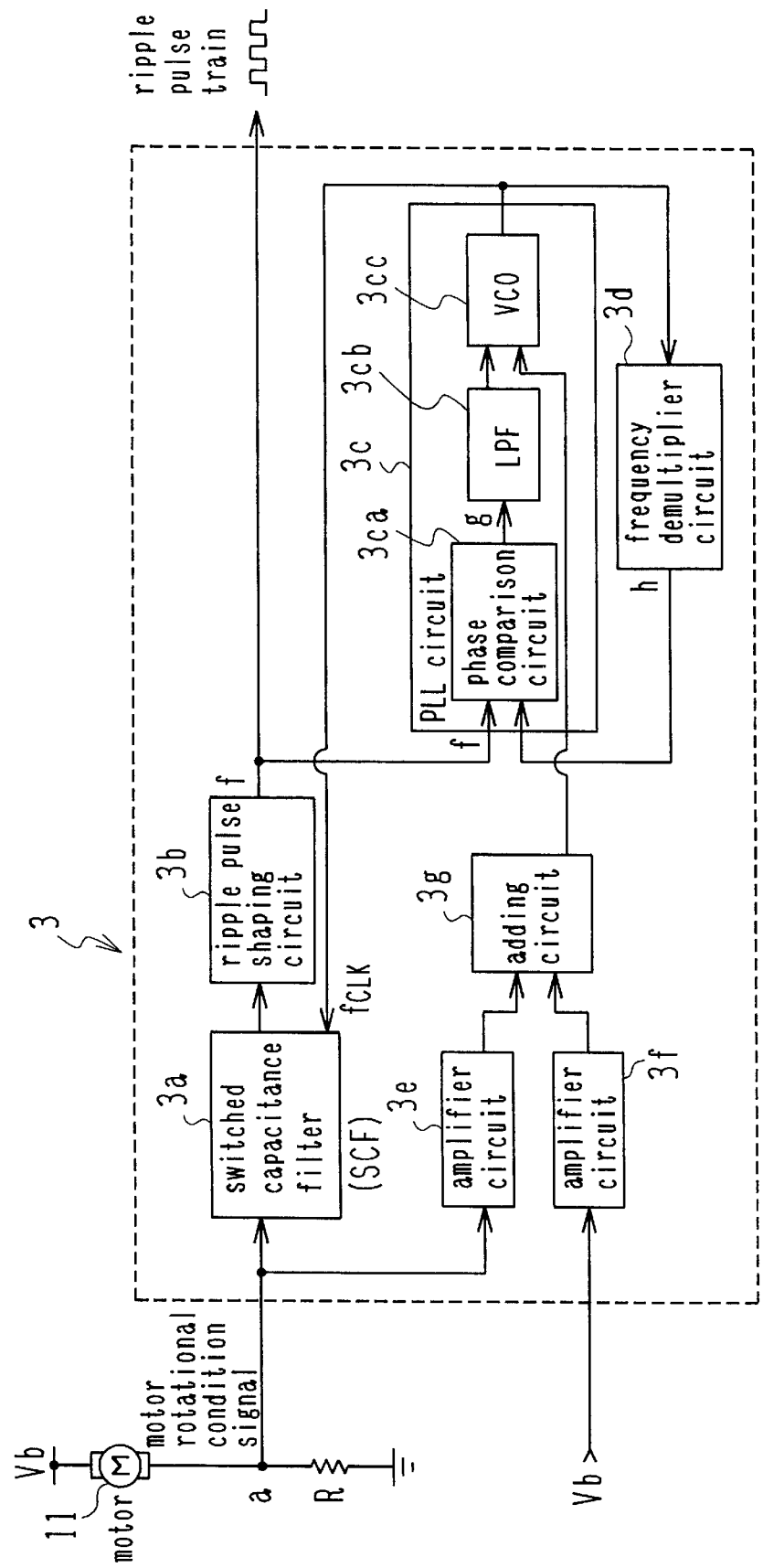
FIG. 1 illustrates a block diagram of a rotational pulse signal generating circuit in accordance with a first embodiment of the present invention.

First of all, with reference to FIG. 1, there is illustrated a schematic diagram of a rotational pulse generating circuit 3 which generates a ripple pulse train indicative of the number of rotation of a commutator DC motor 11. The circuit 3 includes a switched capacitance filter (SCF) 3a which will be hereinafter simply be referred to as a filter, a ripple pulse shaping circuit 3b, and a phase locked loop circuit 3c, a frequency demultiplier circuit 3d, an amplifier circuit 3e, an amplifier circuit or frequency divider circuit 3f, and an adding circuit 3g.

The switched capacitance filter 3a is so designed as to change its filter cutoff frequency fc in response to a change of filter constant upon receipt of an external signal, or clock signal. The ripple pulse shaping circuit 3b generates the ripple pulse train on the basis of an output of the switched capacitance filter 3a.

The circuits 3c, 3d, 3e, 3f, and 3g constitute a clock signal generating circuit which varies the cutoff frequency fc of the switched capacitance filter 3a on the basis of the ripple pulse train issued from the ripple pulse shaping circuit 3b and motor rotational condition signal which is made up of a motor rotational signal and a motor driving voltage Vb.

The phase locked loop circuit 3c is made up of a phase comparison circuit 3ca, a low pass filter 3cb, and an oscillation circuit 3cc. The phase comparison circuit 3ca compares phases of signals inputted therein and issues an output signal depending on the resultant comparison. The low pass filter, (LPF) 3cb smoothes the signal outputted from the phase comparison circuit 3ca. The oscillation circuit (VCO) 3cc oscillates a clock signal whose frequency is $100f$ which depends on a differential signal between the motor rotational condition signal and the output signal of the low pass filter 3cb. The frequency divider circuit 3d divides the oscillation frequency of the clock signal issued from the oscillation circuit 3cc to f. The amplifier circuit 3e amplifies a motor rotational signal issued from the commutator DC motor 11 which is in the form of a voltage signal depending on a motor driving voltage, while the amplifier circuit 3f amplifies the motor driving voltage Vb. Amplified signals issued from the respective amplifier circuits 3e and 3f are fed to the adding circuit 3g to be added therein and the resultant signal is fed, as a motor rotational condition signal, to the oscillation circuit 3cc.

As can be easily understood from FIG. 2(a). the switched capacitance filter 3a is an application version of a well known switched capacitance circuit which is constituted by a pair of analogue switches S1 and S2 and a capacitor C3. If the switches S1 and S2 are turned on and off alternately at a cycle of T, an electric current i flows which is expressed in a formula i=V/(1/fC). Thus, the switched capacitance can be regarded as an equivalent of a resistor R. The cutoff frequency fc of a CR-filter shown in FIG. 2(b) which is an application of such a switched capacitance circuit becomes variable depending on the frequency for alternately turning on-and-off switches. In the case of the switched capacitance filter, instead of frequency, clock input is used. Such a cutoff frequency fc can be expressed as a depicted formula in FIG.2 (b).

It is to be noted that as the switched capacitance filter a commercially available IC is used which is supplied from National Semiconductor under the item code of MF6-50. This has a noise reduction function and provides a cutoff frequency of fc=fCLK/N where fCLK and N are a clock input frequency and a constant, for example, 100 respectively. Thus, setting fCLK=100f results in fc=f.

Figure 3:
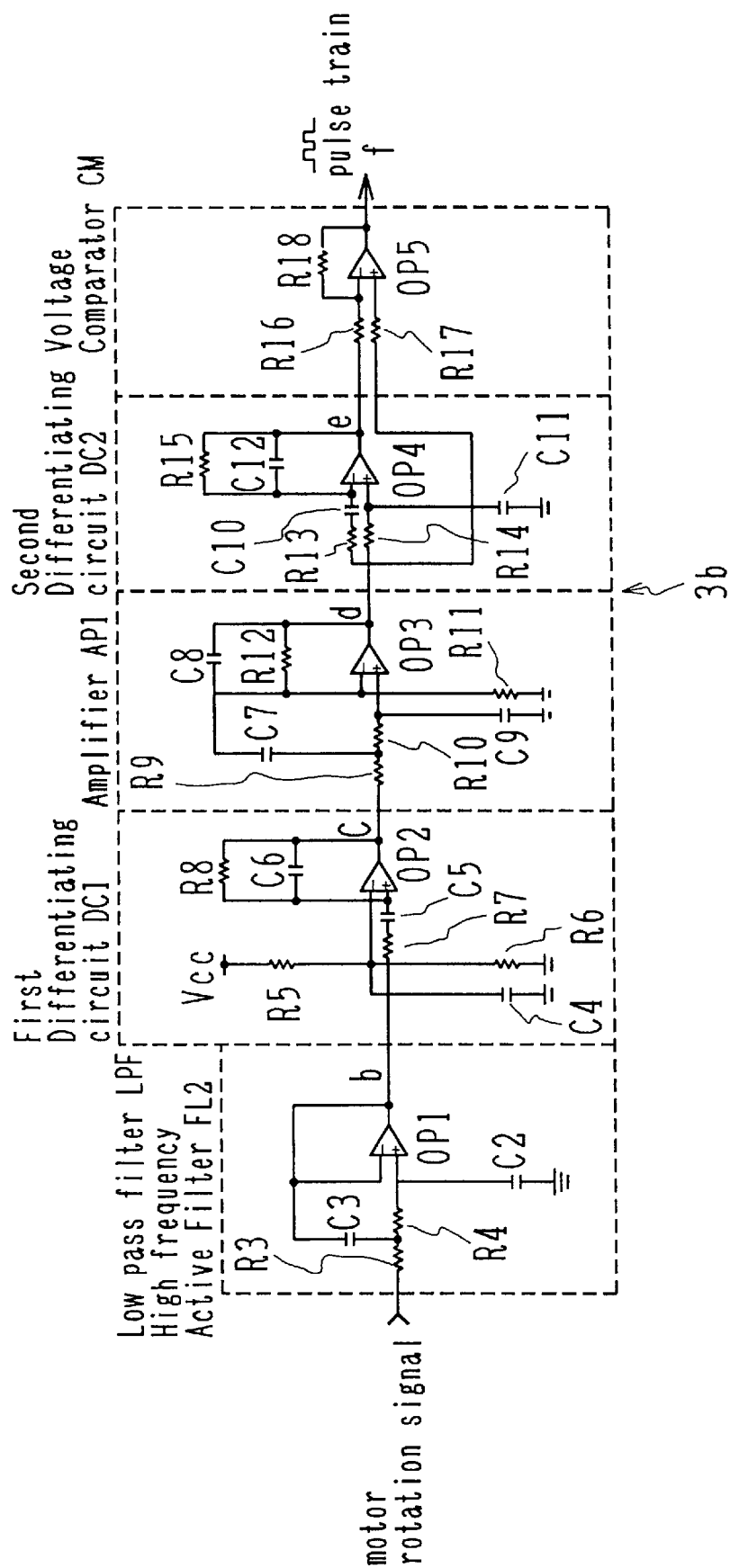
FIG. 3 illustrates a block diagram of a ripple pulse shaping circuit which is a part of the rotational pulse signal generating circuit shown in FIG. 1.

The ripple pulse shaping circuit 3b, as can be seen from FIG.3 includes a high frequency active filter FL2, a first differentiating circuit DC1, a second differentiating circuit DC2, an amplifier AP1, and a voltage comparator CM.

In the high frequency active filter FL2, a series of resistors R3 and R4 are coupled to a non-inverting terminal, of an operational amplifier OP1 which is also grounded to the earth by way of a capacitor C2. An inverting terminal of the operational amplifier OP1 is connected via a capacitor C3 to a connecting point at which the resistors R3 and R4 meet for feedback control. The high frequency active filter FL2 serves for eliminating a high frequency component of the motor rotational signal. In detail, for example, a noise component above the maximum rotational speed (say , 6000 rpm) can be eliminated by its damping or decay factor, which means that the high frequency active filter FL2 acts as low pass filter (LPF) which deletes noise superposed on the motor rotational signal or ripple frequency.

The first differentiating circuit DC1 is connected to an output terminal (b) of the low pass filter LPF, or high frequency active filter FL2 for differentiating the signal issued or outputted therefrom which brings damping, or decaying components of the signal. A series connection of a resistor R7 and a coupling capacitor C5 is connected to the non-inverting terminal of an operational amplifier OP2. A voltage divided by resistors R5 and R6 connected in series is applied to an inverting terminal of the operational amplifier OP2 and a connecting point at which the resistors R5 and R6 meet is coupled with a bypass capacitor C4. A parallel connection of a resistor R8 and a capacitor C6 is connected between the non-inverting input terminal and an output terminal (c) of the operational amplifier OP2.

The amplifier AP1 is so designed as to amplify a signal issued from the output terminal (c) of the operational amplifier OP2 of the first differentiating circuit DC1. The amplifier AP1 includes an operational amplifier OP3 whose non-inverting input terminal is connected to the output terminal (c) of the operational amplifier OP2 via a series of resistors R9 and R10. The non-inverting input terminal of the operational amplifier OP3 is also grounded by way of a capacitor C9. A capacitor C7 is interposed between an inverting terminal of the operational amplifier OP3 and a point at which the resistors R9 and R10 meet. The inverting terminal of the operational amplifier OP3 is grounded by way of a resistor R11. A capacitor C8 and a resistor R12 which are arranged in parallel are connected between the inverting input terminal and an output terminal (d) of the operational amplifier OP3.

The second differentiating circuit DC2 is connected to the output terminal (d) of the operational amplifier OP3 of the amplifier AP1 low pass filter LPF and differentiates a signal outputted therefrom for establishing a phase shift of 90 degrees. The second differentiating circuit DC2 includes an operational amplifier OP4 whose non-inverting input terminal is connected to the output terminal (d) of the operational amplifier OP3 of the amplifier AP1 via a resistor R14. The non-inverting input terminal of the operational amplifier OP4 is grounded by way of a capacitor C11. Between the output terminal (d) of the operational amplifier OP3 and an inverting input terminal of the operational amplifier OP4, there are interposed a resistor R13 and a capacitor C10 which are arranged in series. A resistor R15 and a capacitor C12 which are arranged in parallel are connected between the inverting input terminal and an output terminal (e) of the operational amplifier OP4.

The comparator CM compares output signals from the respective output terminal (e) of the second differentiating circuit DC2 and output terminal (d) of the amplifier circuit AP1. The comparator CM includes an operational amplifier OP5 whose inverting input terminal is connected via a resistor R17 to the output terminal (d) of the operational amplifier OP3 of the amplifier circuit AP1. A non- inverting input terminal of the operational amplifier OP5 is connected via a resistor R16 to the output terminal (e) of the operational amplifier OP4 of the second differentiating circuit DC2. A resistor R18 is connected between the non-inverting input terminal and the output terminal (f) of the operational amplifier OP5. From the output terminal of the operational amplifier OP5, a rectangular pulse train signal or a ripple pulse train signal is set to be outputted which corresponds to the ripple frequency. It is to be noted that this 'ripple pulse train' is based on motor ripple and therefore its wave-shape is in the form of a 'ripple'.

Figure 4:
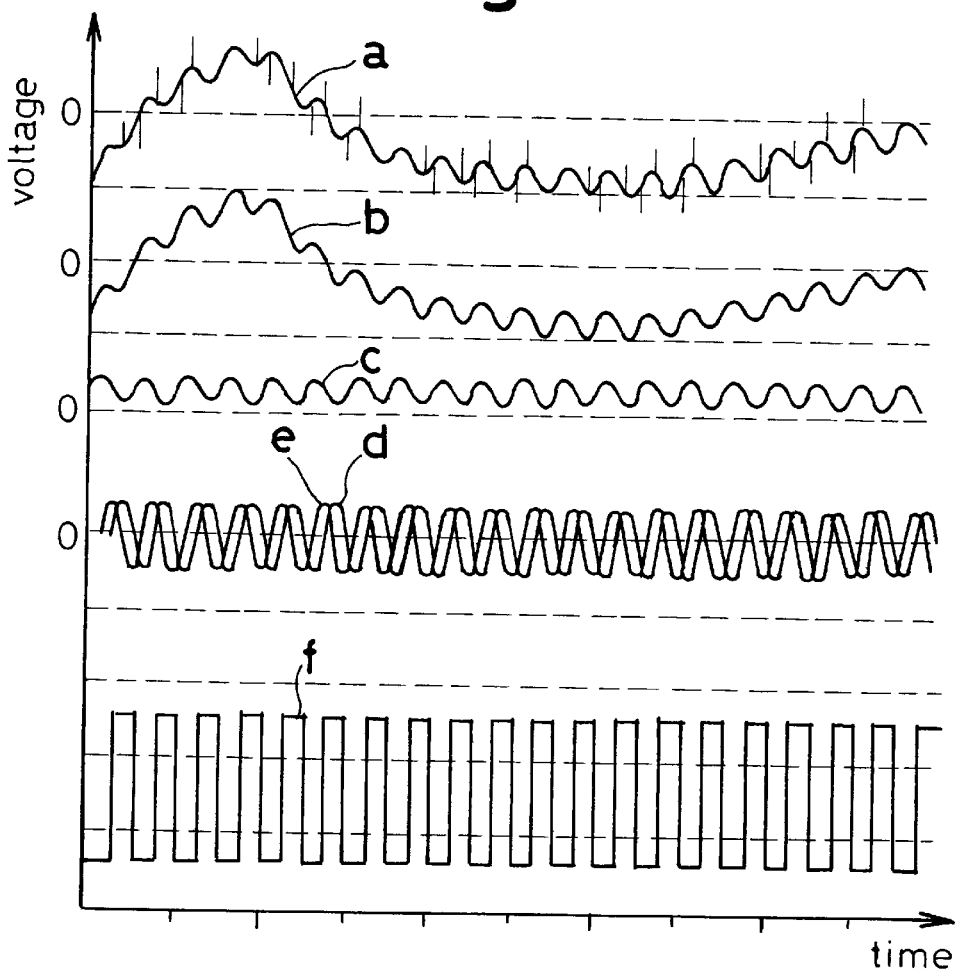
FIG. 4 shows graphs, each of which is indicative of a waveform at various points in the ripple pulse shaping circuit shown in FIG. 3

The signal at each of the output terminals (a), (b), (c), (d), (e), and (f) in the pulse wave-form shaping circuit 3b takes a wave shape as illustrated in FIG. 4.

The current flowing through the commutator DC motor 11 is converted into a voltage signal, or motor rotational signal which is in proportion thereto in magnitude. This voltage signal is superposed with ripple together with noise and has a wave shape indicated with 'a' in FIG. 4. The ripple is inevitable, as is well known, when the commutator DC motor is being driven or turned on.

During passage of the voltage signal through the switched capacitance filter 3a, the noise superposed on the voltage signal is deleted or eliminated from the voltage signal. However, another noise superposed on the clock input whose clock frequency is fCLK which is inputted to the switched capacitance filter 3a appears on the voltage signal when outputted from the switched capacitance filter 3a.

Thereafter, the voltage signal, after passing though the high frequency active filter FL2, comes to have the wave shape as indicated with 'b' in FIG. 4 which is smooth, noise-deleted. Passing such a voltage signal having the wave-shape 'b' through the first differentiating circuit DC1 makes the voltage signal differentiated, to thereby damp or decay its DC component. Thus, the resultant voltage signal attains the wave-shape 'd' in which only a ripple component is involved. Furthermore, if the voltage signal passes through the amplifier AP1, the amplitude of the voltage signal is amplified to have the wave shape 'd. Thereafter, passing such a voltage signal through the second differentiating circuit DC2 brings that the voltage signal becomes to have the wave shape 'e' which delays in a phase of 90 degrees with respect to the wave shape 'd'. Then, comparing the voltage signal having the wave shape 'd' which is outputted from the amplifier AP1 and the voltage signal having the wave shape 'e' which is outputted from the second differentiating circuit DC2, the comparator CM issues the ripple pulse train signal having the wave-shape 'f'.

In the foregoing clock generation circuit, a clock signal is generated which is used as a clock input for the switched capacitance filter $3a$ by a frequency conversion such that the frequency of the ripple signal is multiplied by an integer. In the present embodiment, a feedback of the ripple pulse signal is made in synchronization with the motor rotational condition signal so that the frequency f of the ripple pulse is brought into coincidence with the cutoff frequency fc of the switched capacitance filter $3a$.

In detail, whenever the pulse signal having the wave-shape 'f' is inputted, or fed to the phase locked circuit (PLL) $3c$, the phase locked circuit (PLL) $3c$ outputs a frequency of 100 fp which is derived from the formula of fc=FCLk/N where N=100. Using the frequency demultiplier circuit $3cc$ enables the phase lock loop circuit $3c$ to have a frequency conversion function. The output of the phase lock loop circuit $3c$ having a frequency of 100 fp is divided by 100 at the frequency demultiplier $3d$ and the frequency demultiplier $3d$ feeds the resultant frequency of fp to one of the input terminals of the phase comparison circuit $3ca$, while the other input terminal of the phase comparison circuit $3ca$, is fed with the ripple pulse signal. In brief, a phase control of the output signal of the frequency demultiplier $3d$ is made to oscillate a frequency which is in coincidence with the frequency fp of ripple pulse inputted to the phase locked circuit (PLL) $3c$. Thus, outputting the clock signal is made to be stabilized in a steady area. It is to be noted that changing the demultiplier ratio of the demultiplier circuit $3d$ enables the cutoff frequency fc to be obtained from the following formula:

fc=fclk/(NXK)

where N and K are an integer and a constant, respectively.

In addition, for stabilizing the foregoing oscillation upon initiation of the commutator DC motor 11, the oscillation circuit $3cc$ is fed with the motor rotation condition signal which is made up of the motor rotational signal and the motor driving voltage signal, thereby not making the output of ripple pulse unstable. The motor rotational condition signals serves for producing the ripple pulse train without generating any error pulse.

Figure 5:
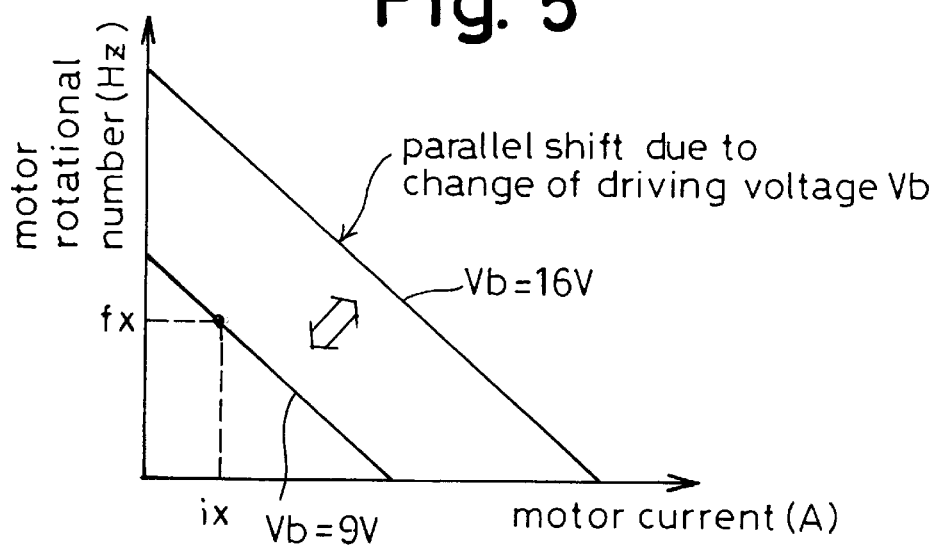
FIG. 5 indicates a relationship between a motor current as a function of motor driving voltage and a motor rotational number.

The following is a detailed explanation operation of the circuit 3 when the commutator DC motor 11 is initiated. The rotational number of the commutator DC motor 11 varies with or depends on the driving voltage Vb. Thus, the rotational number of the commutator DC motor 11 is determined with the usage of a map, or graph shown in FIG. 5 which reveals a relationship between the motor rotational number and a motor current. The motor current is obtained by dividing the motor driving voltage Vb by a shunt resistor R. This graph shows the relationship in case where the motor driving voltage Vb varies from 9 though 16 volts and indicates that the line connecting the motor current and the motor rotational number makes parallel displacements toward a higher side.

For example, when the motor driving voltage Vb is 9 volts, the corresponding inclination of the line is determined, which results in that the motor rotational number at this time becomes fx when the motor current is ix. The oscillation circuit $3cc$ produces a clock pulse having a frequency or cutoff frequency fc which is an integral multiplier of the frequency fx. That is to say, when the commutator DC motor 11 is turned on, the oscillation circuit $3cc$ issues the clock signal folk on the basis of the motor rotational signal and the motor driving voltage, which enable the cutoff frequency to vary, thereby producing a ripple pulse which reflects the motor rotational condition.

Thereafter when the motor current becomes stable and successively the ripple pulse shaping circuit $3b$ begins to produce the ripple pulses, the circuit $3c$ makes the phase control of the clock signal by means of feedback control in such a manner of coincidence between the ripple pulse having the frequency f and the signal outputted from the demultiplier circuit $3d$ in phase. This ensures that the switched capacitance filter $3a$ is inputted with the clock signal of stable oscillation. Thus, the cutoff frequency fc of the switched capacitance filter $3a$, even at an initial phase of the commutator DC motor 11, becomes variable in linear mode and the ripple pulses are produced depending on the variable cutoff frequency.

When the commutator DC motor 11 is at its initial stage, as shown in FIG. 6. the signal takes its wave forms a, g, h, and f at the respective output terminals (a), (g), (h), and (f). When the commutator DC motor 11 is brought into restricted condition such as locked condition during its rotation, the signal takes its wave forms a, g, h, and f at the respective output terminals (a), (g). (h), and (f).

The wave form 'h in FIG. 6($a$) reveals that the cutoff frequency fc can be made to be variable depending on the motor rotation condition while the commutator DC motor 11 is in its initiation area which starts with the initiation of the commutator DC motor 11 and terminates in when the motor current becomes stable, particularly in an earlier stage of the initiation area which starts with the initiation of the commutator DC motor 11 and terminates in producing the ripple pulse. Thus, controlling optimally the cutoff frequency enables the prevention of occurrence of error pulses. In addition, as FIG. 6($b$) reveals, even though the commutator DC motor 11 is brought into rotational restricted condition such as locked condition, due to the fact the cutoff frequency is based on the motor rotational signal and the motor driving voltage, the cutoff frequency can be made to be dependent on changing the motor rotation. Thus, no error pulses occur which varies with the motor rotational number, thereby to enable generating the ripple pulse train in correct manner.

Figure 7:
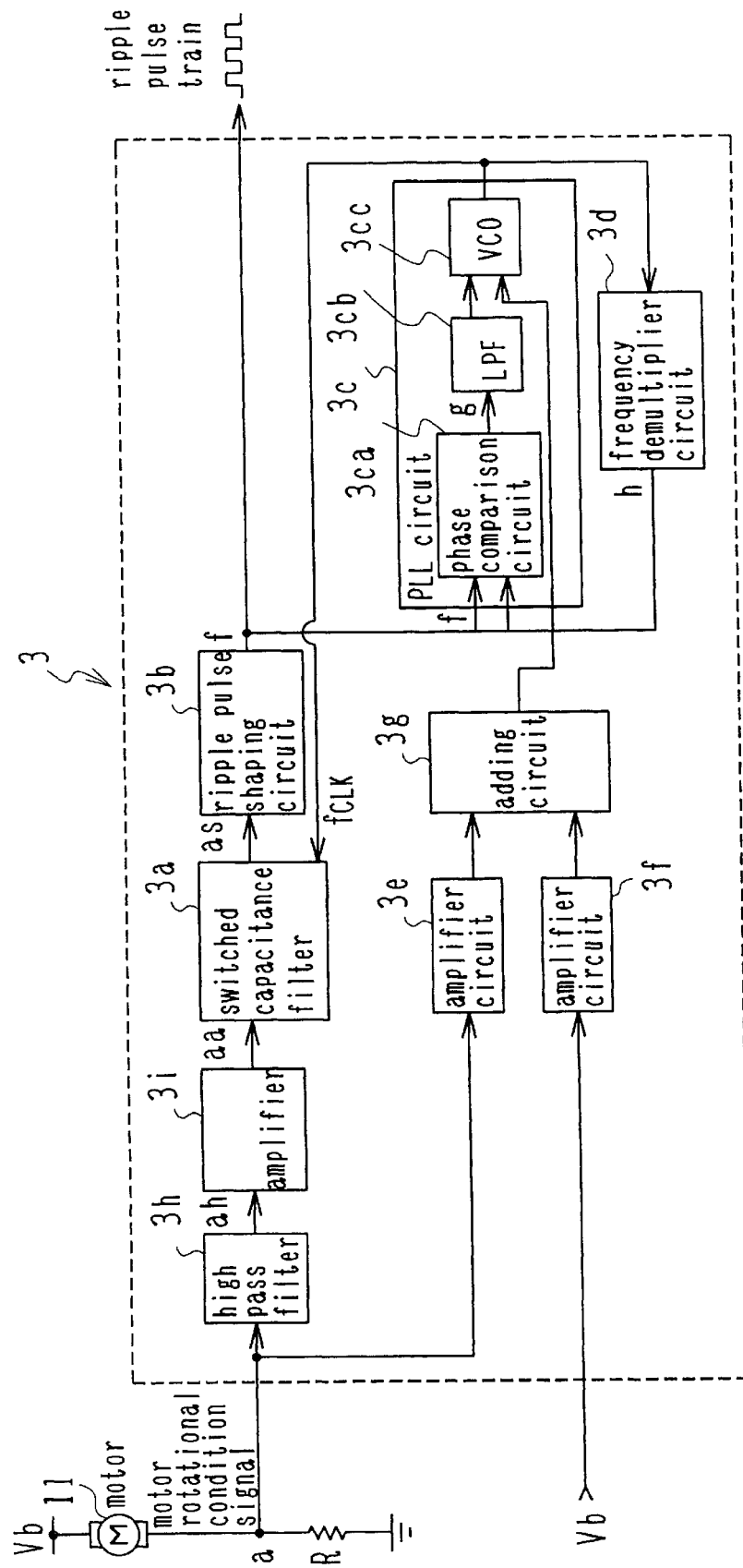
FIG. 7 illustrates a block diagram of a rotational pulse signal generating circuit in accordance with a second embodiment of the present invention.

With reference to FIG. 7, there is illustrated a modified structure of the circuit 3 shown in FIG. 1 which is constructed in such a manner that an in-series connection of a high pass filter $3h$ and an amplifier $3i$ is interposed between the commutator DC motor 11 and the switched capacitance filter $3a$.

This circuit 3 shown in FIG. 7 is an improved version of the circuit 3 shown in FIG. 1. In detail, so long as the commutator DC motor 11 has not been used frequently, its motor current which is a parameter for producing the ripple pulse by way of the motor rotational signal, as shown in FIG. 11($a$), the ripple components of the signals at the output terminals (a), (d), (e), and (f) appear surely. The reason is that in the commutator DC motor 11 which is not overworked an uneven friction wear of the brush relative to the commutator and/or wear powder entered between the brush and the commutator are seldom found. However, with further frequent use or overwork of the commutator DC motor 11 for a long time, the ripple components becomes smaller, thereby producing error pulses such as that no required pulses are produced as seen from FIG. 11(b). The reason for the error pulses are probably the decreasing of ripple amplitude below the minimum amplitude for the pulse generation and/or the component smaller than the ripple frequency as a cause of reducing the ripple amplitude which brings in the difficulty of pulse-generation when affected by noise and so on.

Thus, making the circuit 3 more reliable is necessary to assure the reliability of any control using the pulse signal issued from the circuit 3. To meet such a need, it was decided to amplify the motor rotation signal at a higher and a lower rate when the amplitude of the ripple pulse is higher and lower, respectively in such a manner that the amplifying rate in the lower frequency area is restricted. The reason is that increasing only the amplifying rate merely causes an increase of the motor current when the motor rotation number decreases, which increases the ripple components and noise. Thus, the foregoing series connection of the high pass filter 3h and the amplifier 3i is so designed as to act also as an amplitude correction circuit.

Figure 8:
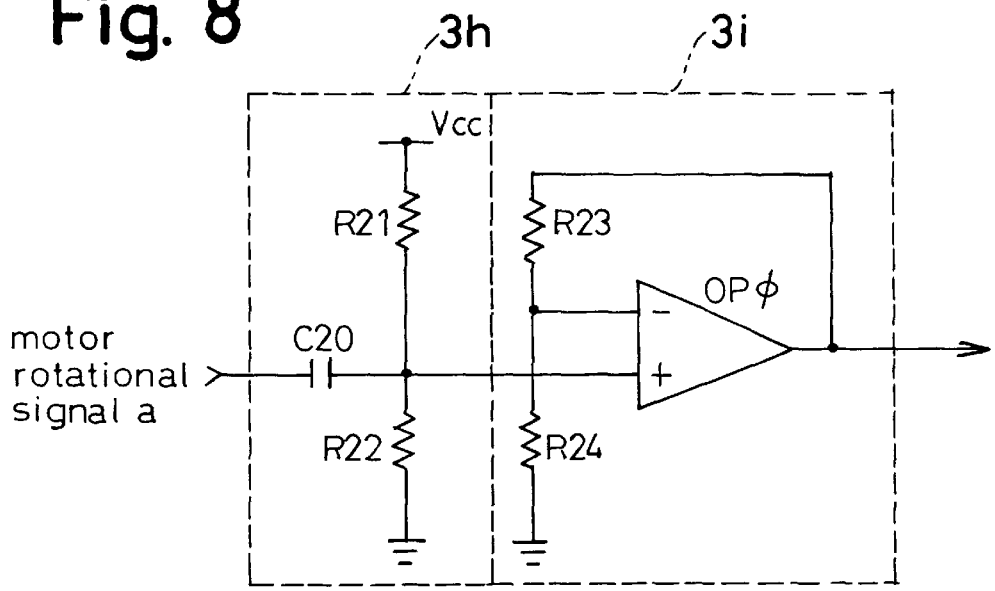
FIG. 8 illustrates an electric circuit of an amplitude correction means which is made up of a high pass filter and an amplifier.
Figure 9:
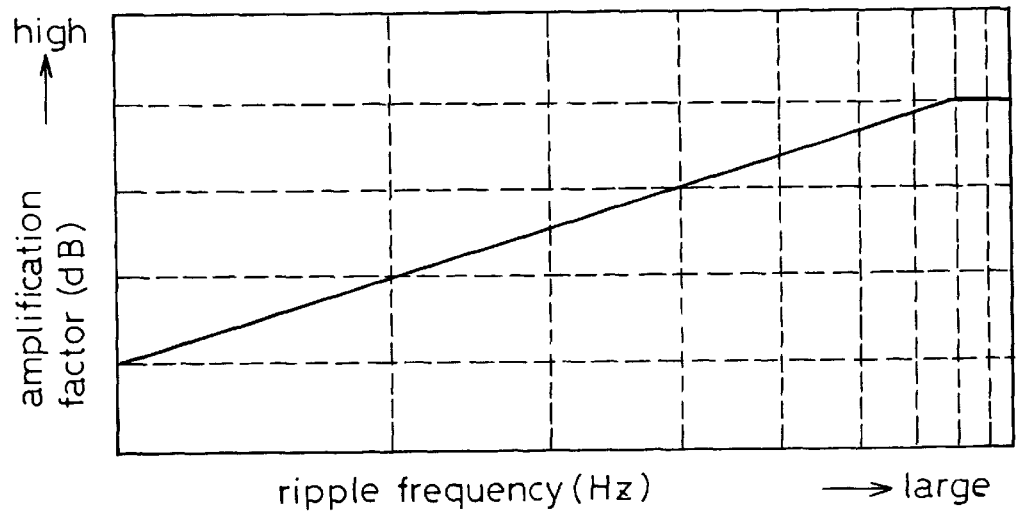
FIG. 9 shows a characteristic graph of the high pass filter shown in FIG. 8.

As shown in FIG. 8, the high pass filter 3h is made up of a capacitor C20, a resistor R21, and a resistor R22, while the amplifier 3i is constituted by an operational amplifier OP0, a resistor R23 and a resistor R24. As can be seen from FIG. 9, above a predetermined ripple frequency, the amplifying rate is restricted so as to be constant, while below the predetermined ripple frequency the amplification factor rate is decreased as the ripple frequency decreases.

The motor rotational signal issued from the commutator DC motor 11 is fed, after condenser-coupling at a condenser C20, to a non-inverting terminal of the operational amplifier OPO together with a voltage which is obtained by dividing a voltage Vcc of, for example, 5 volts by resistors R21 and R22. In addition, a feedback of an output of the operational amplifier OP0 is made to the inverting terminal of the operational amplifier OP0 by way of the resistor R23, with the result that the resistors R23 and R24 constitute an inverting differential amplifier 3i.

When adapting the high pass filter 3h and the amplifier 31 to the device shown in FIG. 1, the high pass filter 3h can decay the frequency component less than the ripple pulse frequency with the results that, despite the decrease of ripple component with age, such frequency component does not affect the formation of the pulse signal. Thus, even though the commutator DC motor 11 used is an aged one, pulse formation is ensured to be formed in any frequency area.

Figure 10:
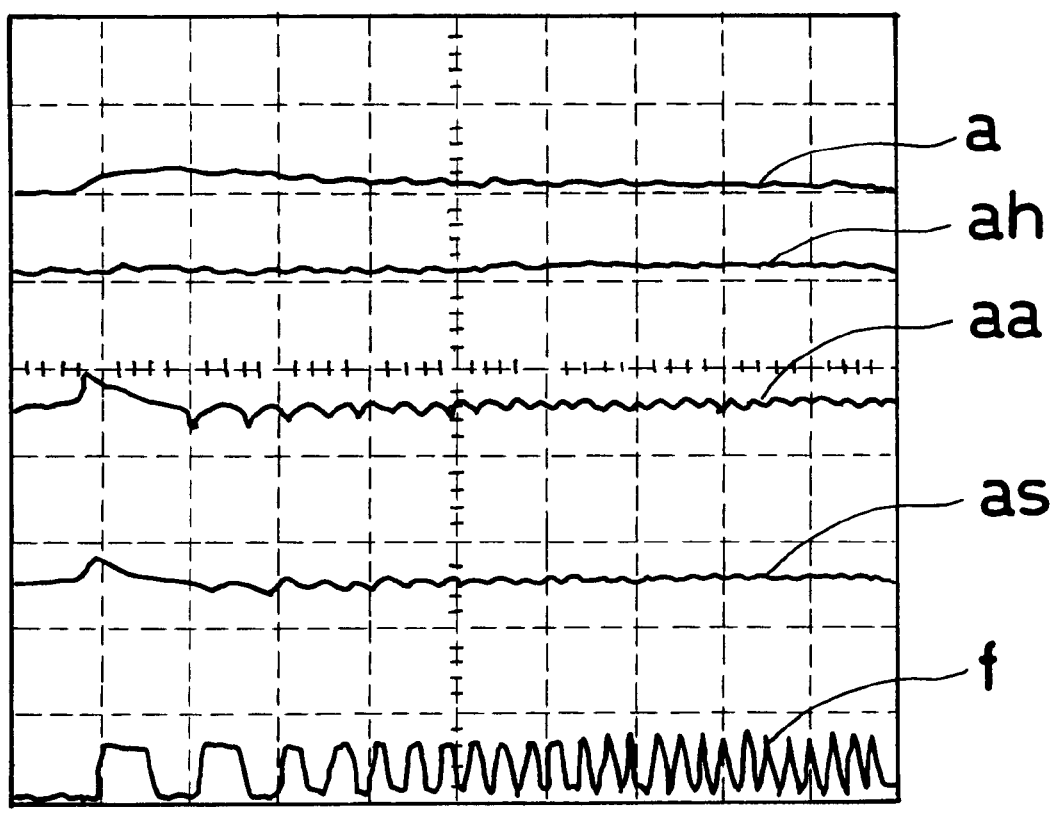
FIG. 10 shows timing chart wherein a waveform at each point in the circuit shown in FIG. 7 is indicated.

It is to be noted a wave-shape of the signal at each point or terminal in the second embodiment is depicted in FIG. 10. As can be easily understood from FIG. 10, adding the simple circuit merely enables issuing ripple pulses without generating an error pulse. In addition, though the set of the high pass filter 3h and the amplifier 3i are provided at a front stage of the switched capacitance filter 3a in the second embodiment, such an arrangement is not restrictive and therefore the effects resulting from such an arrangement remain unchanged even if the set of the high pass filter 3h and the amplifier 3i is provided, or placed at a rear stage of the switched capacitance filter 3a.

In accordance with the present invention, the cutoff frequency of the filter means 3a becomes variable by being fed with the clock signal which is generated based on the ripple pulse and the rotational condition signal of the commutator DC motor 11, which allows the circuit 3 to ensure correct ripple pulse generation depending on the change of the rotational condition of the commutator DC motor 11 which is affected by motor load, rotation, driving voltage, environment and so on.

In this case, for example, even when the commutator DC motor 11 is in the locked condition, the ripple pulse generation remains correct by changing the cutoff filter of the filter means 3a based on the resultant motor rotation.

If the cutoff frequency of the filter means 3a is determined at the initiation of the commutator DC motor 11 by the motor rotational condition signal which is made up of the motor rotational signal and the motor driving voltage signal, at this time, even prior to the ripple pulse generation by the pulse forming means 3b, ripple pulse generation becomes possible by the motor rotational condition signal made up of the motor rotational signal and the motor driving voltage signal, which makes the ripple pulse generated correct or steady dependent on the motor rotational condition even immediately when the commutator DC motor 11 is initiated.

In addition, the clock generation means includes the oscillation circuit 3cc which operates to issue the clock signal so as to be in coincidence with the ripple pulse in frequency phase by feedback control, thereby enabling steady generation of the ripple pulse.

Moreover, the provision of the amplitude correction means which passes only the high frequency component between the motor and the filter means renders the ripple pulse generation correct in any motor rotational area even if the motor is changed with passing of time.

The invention has thus been shown and described with reference to specific embodiments, however, it should be understood that the invention is in no way limited to the details of the illustrated structures but changes and modifications may be made without departing from the scope of the appended claims.

What is claimed is:

1. A rotational pulse signal generating circuit for a commutator DC motor comprising:

filter means for eliminating noise from the commutator DC motor, a cutoff frequency of the filter means being variable depending on a cutoff signal;

pulse shaping means for generating a ripple pulse train indicative of a rotational number of the commutator DC motor by wave-shaping an output of the filter means; and clock generating means inputted into a rotational condition signal of the commutator DC motor and the ripple pulse and for generating the clock signal on the basis of the ripple pulse and the rotational condition signal, the clock signal being fed to the filter means for varying the cutoff frequency.

2. A rotational pulse signal generating circuit as set forth in claim 1, the commutator DC motor rotational condition signal being based on a motor rotational signal and a motor driving voltage, the cutoff frequency at an initiation of the commutator DC motor is determined by the motor rotational condition signal.

3. A rotational pulse signal generating circuit as set forth in claim 1, wherein the clock generating means includes an oscillation circuit whose output signal is brought into coincidence with the ripple pulse in phase.

4. A rotational pulse signal generating circuit as set forth in claim 1 further comprising amplitude correction means interposed between the motor and the filter means, the amplitude means passes therethrough only a higher frequency component of the motor rotational signal.

* * * * *